United States Patent
Carcido et al.

(10) Patent No.: US 7,177,925 B2
(45) Date of Patent: Feb. 13, 2007

(54) EVENT MANAGEMENT SYSTEM

(75) Inventors: Glenn Rosa Carcido, Grass Valley, CA (US); Robert Scott Fryman, Roseville, CA (US); Kevin William Lemay, Folsom, CA (US); Frank L. Mantong, Elk Grove, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 762 days.

(21) Appl. No.: 10/259,534

(22) Filed: Sep. 27, 2002

(65) Prior Publication Data

US 2004/0205773 A1 Oct. 14, 2004

(51) Int. Cl.
*G06F 9/00* (2006.01)
*G06F 9/38* (2006.01)

(52) U.S. Cl. .................. 709/223; 709/100; 709/102; 709/103; 709/104; 709/105; 710/200; 710/260; 712/244; 712/228

(58) Field of Classification Search ........ 709/223–225, 709/212, 245, 103–105; 711/147; 712/2, 712/32, 244, 228; 713/1, 100
See application file for complete search history.

(56) References Cited

U.S. PATENT DOCUMENTS

| | | | |
|---|---|---|---|
| 5,530,868 A | 6/1996 | Record et al. | |
| 5,566,337 A | 10/1996 | Szymanski et al. | |
| 5,838,969 A * | 11/1998 | Jacklin et al. | 719/318 |
| 5,881,315 A | 3/1999 | Cohen | |
| 5,925,108 A | 7/1999 | Johnson et al. | |
| 5,933,645 A | 8/1999 | Wallack | |
| 6,058,387 A * | 5/2000 | Campbell et al. | 706/60 |
| 6,237,081 B1 | 5/2001 | Le | |
| 6,295,602 B1* | 9/2001 | Weissman et al. | 713/1 |
| 6,857,064 B2* | 2/2005 | Smith et al. | 712/244 |
| 6,883,107 B2* | 4/2005 | Rodgers et al. | 713/601 |
| 2002/0128934 A1* | 9/2002 | Shaer | 705/27 |
| 2002/0133653 A1 | 9/2002 | Reilly | |

FOREIGN PATENT DOCUMENTS

| | | |
|---|---|---|
| GB | 2274180 | 7/1944 |
| GB | 2349256 | 10/2000 |
| GB | 2365288 | 2/2002 |

* cited by examiner

*Primary Examiner*—David Wiley
*Assistant Examiner*—Jude J Jean-Gilles

(57) ABSTRACT

One embodiment of an event management system, operating on a computer system having event producers and event consumers, includes an initial event handler program and an event queue having a first event. The initial event handler program retrieves the first event from the event queue for event processing. This event processing returns a first response to the initial event handler program, wherein the initial event handler program manages the first event on the event queue based on the first response.

32 Claims, 11 Drawing Sheets

EVENT MANAGEMENT SYSTEM

THE FIELD OF THE INVENTION

The present invention generally relates to computer systems, and more particularly, to an event management system operating on a computer system having event producers and event consumers.

BACKGROUND OF THE INVENTION

One type of conventional computer system, referred to as an event-based system, relies on events to elicit actions. Event-based systems, include event producers and event consumers. Event producers create events and communicate these events to the system. Event consumers act on or process the events.

Event-based systems can have a small or large number of event producers and event consumers. A small event-based system may have only a few event producers and a few event consumers. In such small event-based systems, one event producer is often tied to one event consumer. In larger event-based systems, many event producers create events, which are directed to many event consumers. In such large event-based systems, one event is often sent to many event consumers.

Generally, events are requests for some action. General event types include user-input events, system messaging events, and inter-application events. User-input events are initialized by a system user and include events such as a keystroke, a mouse click, and a disk file insertion. System messaging events are messages between an operating system and an application program. Examples of system messaging events include requests to create a new file, display a window, and change the contents of a file. Inter-application events are requests for action between application programs including connecting to a network and communicating through a network. Each of these events is directed to at least one event consumer for event processing.

Event management systems, which operate on event-based systems, manage events. In small event-based systems, an event management system handles a small number of events with a limited set of event consumers. In a small event-based system, the event management system is often a series of computer program instructions or statements, which compare event information to selected criteria and direct the event to the appropriate event consumer. For example, an event management system can include a switch statement with multiple cases written in C language code or a series of if statements with jump instructions written in another language. These decision-making statements are typically stored in one or more source code files. Similarly, the event consumers are also typically stored in one or more source code files. The decision-making statements and event consumers are compiled together to create an executable program.

In small event-based systems, new event consumers may be added to increase functionality. For example, new event consumers are added to accommodate expanded user needs or for debugging and testing purposes. Adding a new event consumer typically involves changing the decision-making code, adding the new event consumer to the source code, and recompiling to create a new executable program. Assuming that the old executable program was tested, adding a new event consumer destabilizes the event-based system platform, which results in additional system testing. Adding a new event consumer for debugging and testing not only changes the code under test, but removing the debugging and testing code destabilizes the tested event-based system platform. Although the new event consumer could be retained in the new code after testing, the new code would take up more memory space, which is often at a premium.

During operation, an event-based system receives an event from an event producer. In a small event-based system, this event is passed to the decision-making statements. The decision-making statements compare the event information to selected criteria, one at a time, until the event information arrives at the appropriate case or if statement. The executable program then calls the selected event consumer and the event is processed. This event management operation is time consuming, and it is possible that during this event management operation, the event-based system will not be able to respond to new events. Consequently, events can be dropped due to an overrun condition resulting from limited resources. Also, other portions of the event-based system are potentially starved for data while the system is processing events.

In larger event-based systems, the event management system handles a large number of events using a large number of event consumers. Some larger, more complex event management systems do not have the above problems associated with small event management systems. Nevertheless, larger event management systems typically employ operating system facilities to manage events. For example, some large event management systems are implemented with multi-tasking facilities of the operating system. In a multi-tasking environment, system functionality is divided into small functional units, such that a specific function is associated with a specific task. The operating system switches between these tasks to complete processing in an operation referred to as context switching. During context switching, copies of data being processed are stored in memory, while other data are switched in for processing. Thus, the multi-tasking environment adds overhead to the event-based system in the form of processing time and memory requirements. The multi-tasking overhead can significantly degrade system performance. In addition, in some systems the multi-tasking memory requirements exceed the amount of available memory.

For reasons stated above and for other reasons presented in the description of the preferred embodiments section of the present specification, an improved event management system is desired which does not have the above problems associated with small event management systems and which can be implemented in a single-tasking environment.

SUMMARY OF THE INVENTION

One aspect of the present invention provides of an event management system, operating on a computer system having event producers and event consumers. The event management system includes an initial event handler program and an event queue having a first event. The initial event handler program retrieves the first event from the event queue for event processing. The event processing returns a first response to the initial event handler program. The initial event handler program manages the first event on the event queue based on the first response.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
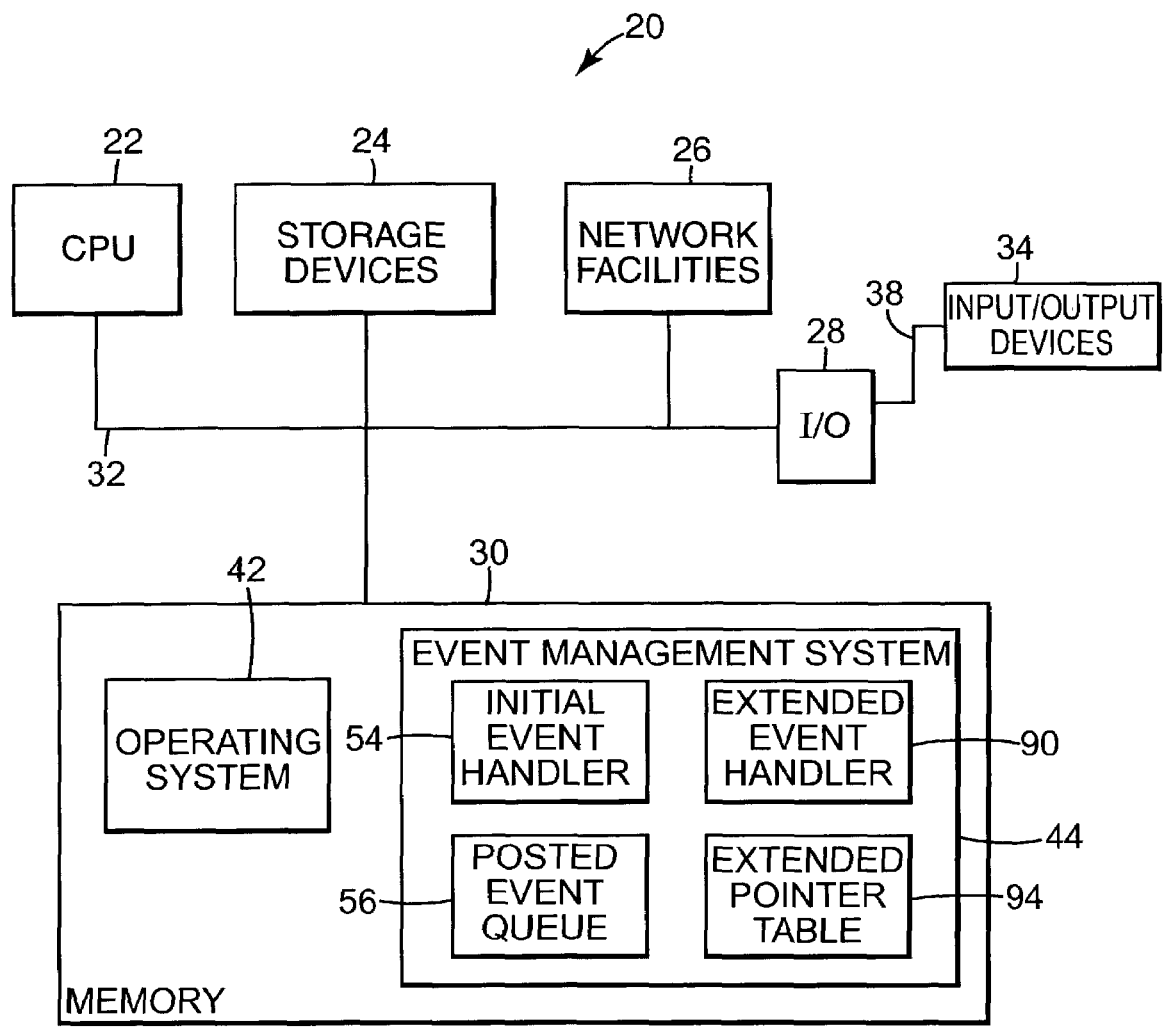
FIG. 1 is a block diagram illustrating one exemplary computer system on which an exemplary embodiment of an event management system, according to the present invention, is implemented.

FIG. 1 is a block diagram illustrating one exemplary computer system 20 on which an exemplary embodiment of an event management system according to the present invention is implemented. Computer system 20 is an event-based system and includes a central processing unit (CPU) 22, storage devices 24, network facilities 26, an input/output (I/O) controller 28, and a memory 30, all electrically coupled to one another via a system bus 32. I/O controller 28 is also electrically coupled to input/output (I/O) devices 34 via line 38. It is understood that different components could be substituted for the example illustrated components of the computer system 20 and components could be added or removed, without altering the present invention. It is also understood that an exemplary embodiment of the present invention could be implemented in other event-based systems, such as a security system, a network switch, or a network server.

In one embodiment of computer system 20, the CPU 22 is a single microprocessor. However, other event-based systems embodying the present invention, include other types of processing units, such as a mainframe processor, multiple processors, or a micro-controller.

In one embodiment, storage devices 24 includes a disk drive and an external storage device, such as a back up tape drive. One embodiment of, network facilities 26 includes a network card and a connection to a network, such as a local area network (LAN) or the Internet. I/O controller 28 is suitably a controller card or an integrated controller for handling multiple input devices 34 and output devices 36. I/O devices 34 and 36 can include a keyboard, a video monitor, a mouse, and other I/O devices such as sensors or RF interfaces. The above-described components of the computer system 20 are event producers.

Memory 30 stores software for controlling computer system 20. Memory 30 typically includes volatile memory, such as RAM, and non-volatile memory, such as ROM, EEPROM, and Flash memory. The software stored memory 30 includes an operating system 42, such as DOS, UNIX, Windows, a proprietary operating system, and/or other suitable operating systems. The software stored in memory 30 also includes an event management system 44. CPU 22 executes operating system 42 and event management system 44 to control the operation of computer system 20.

During operation, CPU 22 retrieves and executes instructions from memory 30. Operating system 42 includes a main loop and CPU 22 executes the main loop and calls other programs as needed for processing. Events from event producers are received by operating system 42, which calls event management system 44. CPU 22 proceeds to execute event management system 44 to process the received events. The received events include user-input events, system messaging events, and inter-application events.

Example user-input events include keyboard presses and mouse clicks, which are retrieved by I/O controller 28. The user-input events are then retrieved from I/O controller 28 by operating system 42, executing on the CPU 22. Operating system 42 calls event management system 44 to process the user-input events.

System messaging events include messages between operating system 42 and other programs, for example, programs employed to control storage devices 24. The system messaging events are retrieved from storage devices 24 over system bus 32 by operating system 42, executing on the CPU 22. Operating system 42 calls event management system 44 to process the system messaging events.

Inter-application events are requests for actions between application programs, such as, for example, the requests for actions between an Internet browser application program and an application program residing on the Internet network. In this example situation, messages between the browser applications program, executing on CPU 22, and the network application program pass through system bus 32 and network facilities 26. Operating system 42 interacts with the browser application program, to receive events and call event management system 44 to process the inter-application events.

Event management system 44 processes events from event producers by calling one or more event consumers. These event consumers are often programs residing in memory 30 of computer system 20. The event consumers pass information to the components of computer system 20.

One exemplary embodiment of event management system 44 described herein includes an initial event handler 54 and a posted event queue 56 for storing event information. Initial event handler 54 stores incoming events at the end of posted event queue 56 and retrieves events from the beginning of posted event queue 56. This event queuing operation buffers the incoming events, which can prevent overrun conditions. Also, with an event posted to posted event queue 56, memory associated with the processing of the event can be freed for use in other parts of computer system 20.

One exemplary embodiment of event management system 44 also includes an extended event handler 90 for managing multiple event consumers associated with the processing of one event. Extended event handler 90 is accessed via an extended pointer table 94 having a pointer to extended event handler 90 in place of a pointer to a default event consumer. Initial event handler 54 calls extended event handler 90 to process events through multiple event consumers, which may or may not include the supplanted default event consumer. In one embodiment, extended event handler 90 calls one event consumer at a time, in serial fashion, going from one event consumer to the next until processing is complete. Retry information is stored and passed to initial event handler 54, which maintains the event on posted event queue 56 if processing was not completed. Extended event handler 90 allows multiple event consumers to be added without altering the default event consumer code or call routines. In this manner, processing is accomplished in an orderly fashion without taking an extraordinary amount of computer system 20 processing time or memory resources.

Figure 2:
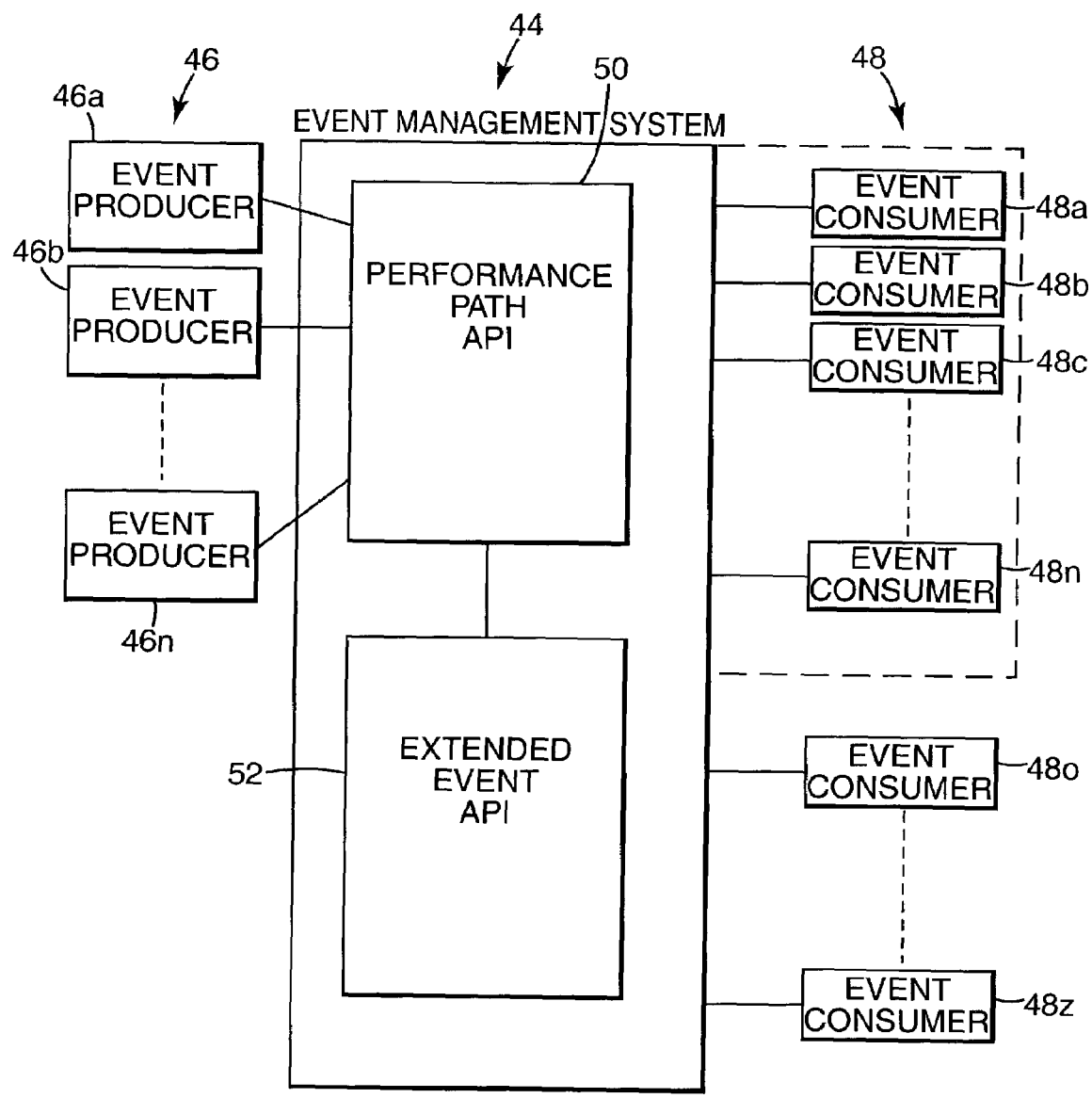
FIG. 2 is a block diagram illustrating an exemplary embodiment of an event management system, according to the present invention, in communication with event producers and event consumers.

FIG. 2 is a block diagram illustrating an exemplary embodiment of event management system 44 according to the present invention in communication with event producers 46 and event consumers 48. Event producers 46 can be any of the components of the computer system 20. Event consumers 48 are programs, which process or handle the events. Event management system 44 is called by operating system 42 to process events from event producers 46. In turn, event management system 44 calls event consumers 48. Operating system 42 and event management system 44 are executed on CPU 22. Similarly, event consumers 48 are also executed on CPU 22.

Event management system 44 includes a performance path application program interface (API) 50 and an extended event API 52. Performance path API 50 is in communication with all event producers 46a–46n. The number of event producers 46a–46n in computer system 20 can be expanded to accommodate the needs of the user. Performance path API 50 is in communication with a subset of the event consumers 48, including event consumers 48a–48n, which are tightly coupled to performance path API 50. The number of event consumers 48a–48n can also be expanded to accommodate the needs of the user.

Extended event API 52 can access all event consumers 48a–48z. Event consumers 48o–48z are consumers added to accommodate the needs of the user. These additional event consumers 48o–48z can add increased functionality to computer system 20, such as debugging and testing functions. The number of event consumers 48o–48z can also be expanded to accommodate the needs of the user.

One exemplary embodiment of performance path API 50 calls one of event consumers 48a–48n or, in the alternative, extended event API 52. Extended event API 52 calls selected ones of event consumers 48a–48z serially, to process an event. The event consumers 48a–48z can be called in any order by extended event API 52. After processing, extended event API 52 passes control back to performance path API 50 and operating system 42.

In operation, operating system 42 receives an event from an event producer 46 and calls event management system 44. Operating system 42 passes the event information to performance path API 50, which receives the event for subsequent event processing. To process the event, performance path API 50 calls either a particular one of event consumers 48a–48n or extended event API 52. The chosen one of event consumers 48a–48n or extended event API 52 attempts to process the event and passes a first response back to performance path API 50. In one embodiment, the first response indicates that the event was successfully processed, a retry is in order, or the event was moved and stored in memory 30.

If called, extended event API 52 calls one of event consumers 48a–48z from a series of selected event consumers 48a–48z. The called one of event consumers 48a–z attempts to process the event and if successful passes this information to extended event API 52 in a second response. Extended event API 52 determines if any more event consumers 48a–48z need to be called. If the series of selected event consumers 48a–48z is complete, extended event API 52 passes a successful response to performance path API 50. Alternatively, if the event is successfully processed and the series of selected event consumers 48a–48z is not complete, extended event API 52 calls the next event consumer 48 in the series.

Unsuccessful processing of an event results in a retry response passed to extended event API 52 and performance path API 50. This same event is processed by the same unsuccessful one of event consumers 48a–48z when event management system 44 is next called by operating system 42. A moved response received in the second response is passed on to performance path API 50.

Performance path API acts based on the first response from either one of event consumers 48a–48n or extended event API 52. If processing is successful, performance path API 50 either processes the next event or passes control back to operating system 42. If processing is not successful, a retry is performed. To initiate the retry, performance path API 50 passes control to operating system 42. In this situation, event management system 44 attempts to process the same event when next called by operating system 42. If the event is moved, performance path API 50 either processes the next event or passes control to operating system 42. A moved event will not be processed the next time event management system 44 is called by operating system 42.

Figure 3:
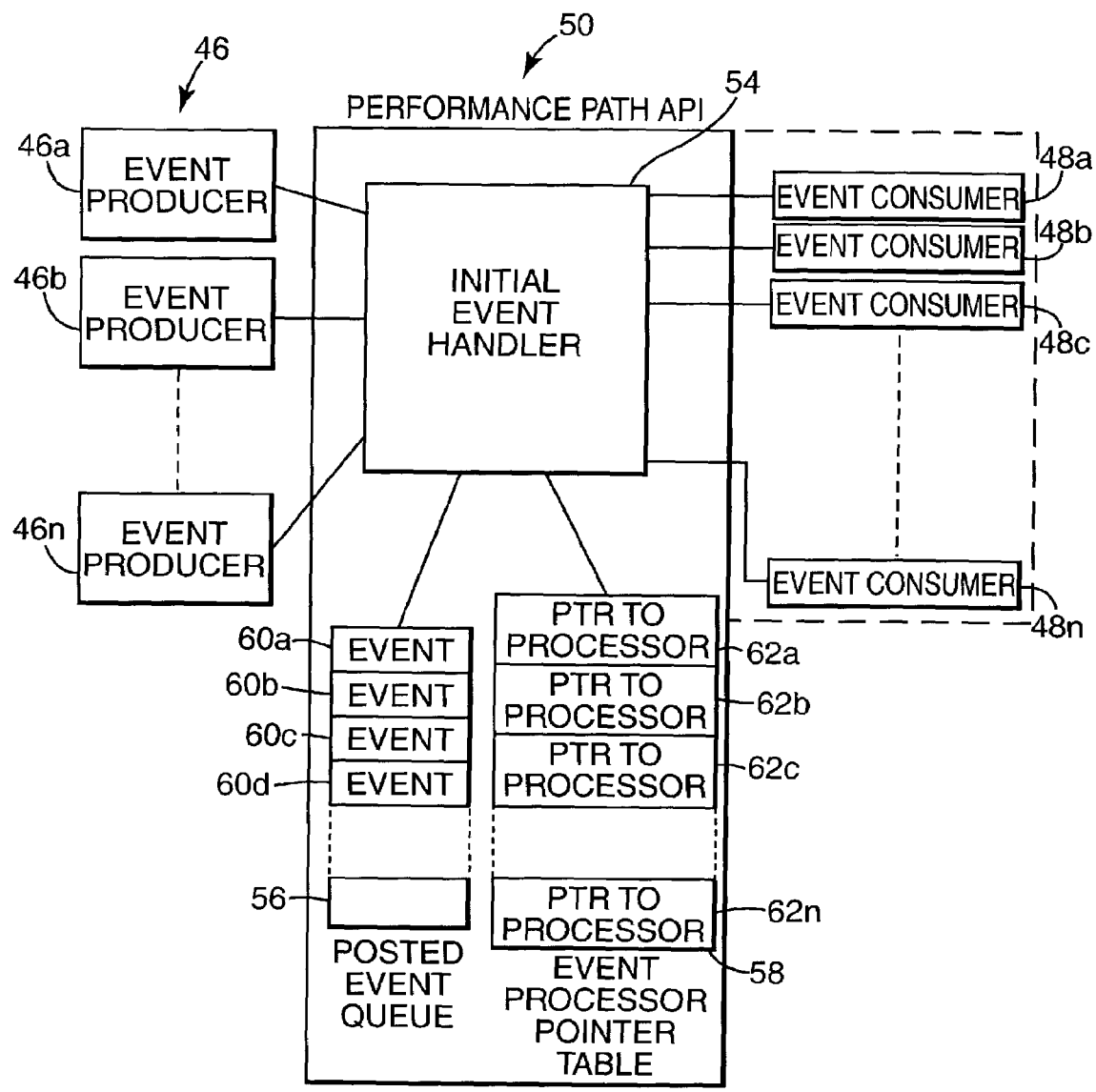
FIG. 3 is a block diagram illustrating an exemplary embodiment of a performance path application program interface (API), according to the present invention.

FIG. 3 is a block diagram illustrating an exemplary embodiment of performance path API 50 according to the present invention. Performance path API 50 includes an initial event handler 54, a posted event queue 56, and an event processor pointer table 58. Initial event handler 54 is in communication with event producers 46a–46n and event consumers 48a–48n. Initial event handler 54 has numerous functions. For example, initial event handler 54 controls posted event queue 56 and accesses event processor pointer table 58. Initial event handler 54 receives events from event producers 46a–46n and posts events to posted event queue 56. Initial event handler 54 also retrieves events from posted event queue 56, uses event information to access event processor pointer table 58 and calls event consumers 48a–48n. In another configuration, initial event handler 54 is in communication with and calls extended event API 52, instead of one or more of event consumers 48a–48n.

Posted event queue 56 holds event information in event elements 60a–60d. In one example embodiment, posted event queue 56 is a circular queue with up to 256 elements in memory 30. However, posted event queue 56 can be other suitable sizes and can be adjusted to accommodate user needs. Also, other embodiments of posted event queue 56 are not implemented as circular queues. For example, other embodiments of posted event queue 56 include a linked list queue and an array. Each event element 60a–60d contains information about an event from one of the event producers 46a–46n.

Event processor pointer table 58 includes pointers to processors 62a–62n for handling events. These processors for handling events are either event consumers 48a–48n or extended event API 52. In one configuration, wherein performance path API 50 does not call extended event API 52, the pointers 62a–62n correspond directly, on a one to one basis, with the event consumers 48a–48n (i.e., pointer 62a points to event consumer 48a, pointer 62b points to event consumer 48b, . . . and pointer 62n points to event consumer 48n). In this configuration, each pointer 62 points to only one event processor.

Figure 4:
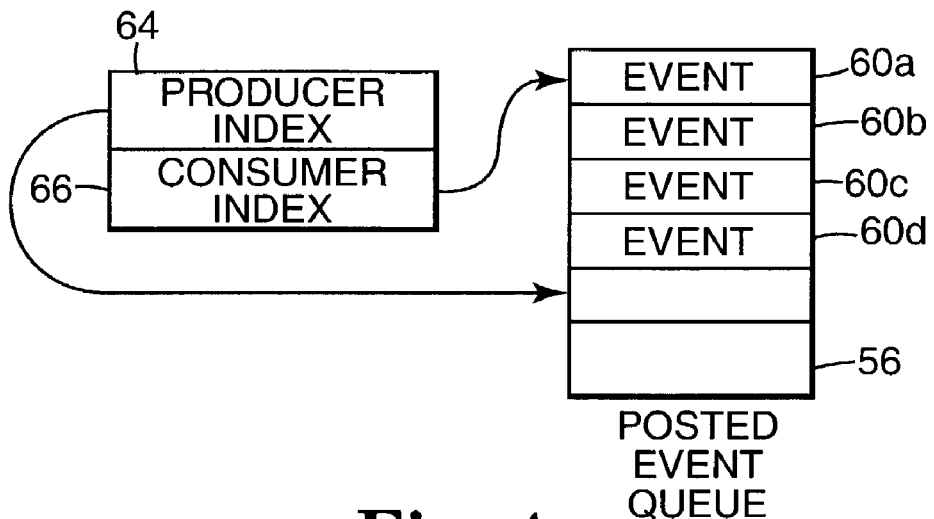
FIG. 4 is a block diagram illustrating an exemplary embodiment of a method for posting and retrieving events from a posted event queue, according to the present invention.

FIG. 4 is a block diagram illustrating one exemplary embodiment of a method for posting and retrieving events from posted event queue 56. Initial event handler 54 posts events to posted event queue 56 at a producer index 64 and retrieves events from posted event queue 56 at a consumer index 66. Producer index 64 points to the next available space in posted event queue 56 (i.e., the element or space following event element 60d). After an event has been posted, initial event handler 54 increments producer index 64 to point to the next available space. Consumer index 66 points to the next event to be processed (i.e., event element 60a). Initial event handler 54 increments consumer index 66 to remove one of event 60a–60d from posted event queue 56. With posted event queue 56 implemented as a circular queue, events removed by incrementing consumer index 66 are over-written by new events posted to posted event queue 56.

Figure 5:
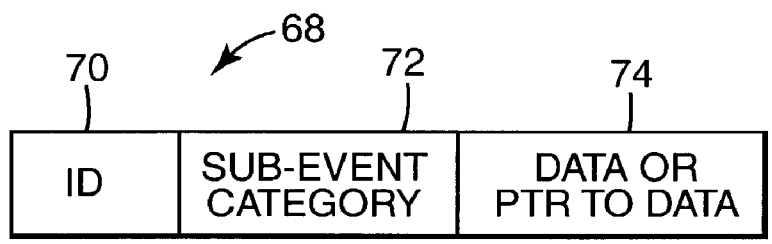
FIG. 5 is a diagram illustrating an exemplary embodiment of an event data structure for the events in a posted event queue.

FIG. 5 is a diagram illustrating one exemplary embodiment of an event data structure 68 for the event elements 60a–60d in posted event queue 56. Event data structure 68 includes an identification (ID) section 70, a sub-event category section 72, and a data section 74. ID section 70 is an index into event processor pointer table 58. Accordingly, initial event handler 54 uses ID section 70 (i.e., the index) to select an appropriate one of pointers 62a–62n. Sub-event category section 72 contains information that categorizes the event into a particular group. With group information, an event processor can handle all events in a particular group in the same manner. Data section 74 includes relevant event data or a pointer to relevant event data in memory 30. Event data structure 68 is passed along for event processing.

Figure 6:
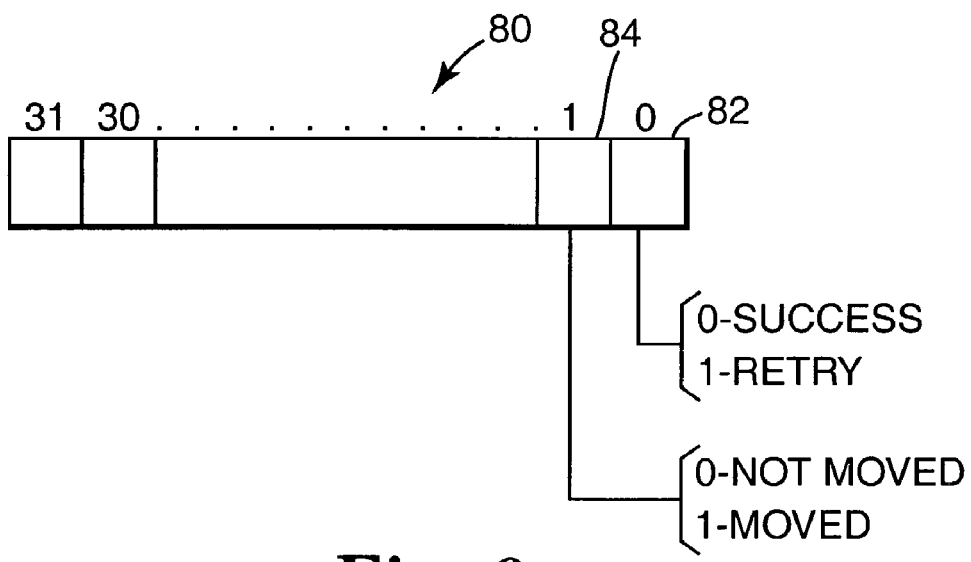
FIG. 6 is a diagram illustrating an exemplary embodiment of a first response to an initial event handler.

FIG. 6 is a diagram illustrating one exemplary embodiment of a first response 80 to initial event handler 54. First response 80 is passed back to initial event handler 54 from either one of event consumers 48a–48n or extended event API 52. In one embodiment, first response 80 includes bit zero indicated at 82, which indicates success with a zero and retry with a one. In one embodiment, first response 80 also includes bit one indicated at 84, which indicates not moved with a zero and moved with a one.

In operation, operating system 42 calls event management system 44 to process new events and continue processing posted events 60a–60d. Initial event handler 54 configures each new event into an event data structure 68 having an ID section 70, a sub-event category section 72, and a data section 74. Initial event handler 54 also checks each new event and, based on preprogrammed criteria, either attempts processing the new event immediately or posts the new event to posted event queue 56. To immediately process the new event, initial event handler 54 calls an event processor, either one of the event consumers 48a–48n or the extended event API 52. Initial event handler 54 passes event data structure 68 to the event processor during the call operation. If the new event is successfully processed or moved, the new event is never posted to posted event queue 56. However, if a retry is indicated, initial event handler 54 posts the new event to posted event queue 56. New events are posted to posted event queue 56 by placing the event data structure 68 in posted event queue 56 at the producer index 64, which in one embodiment is the next available space in posted event queue 56. In one embodiment, initial event handler 54 posts all new events to posted event queue 56.

Initial event handler 54 uses consumer index 66 to process posted events 60a–60d from posted event queue 56. Initial event handler 54 retrieves one of the events 60a–60d at the consumer index 66. Initial event handler 54 employs the ID section 70 from the retrieved event 60 as an index into event processor pointer table 58 to thereby retrieve a selected pointer to a processor 62 from event processor pointer table 58. Next, initial event handler 54 calls the event processor pointed to by the selected pointer to the processor 62. This event processor is either one of the event consumers 48a–48n or the extended event API 52.

The following example operation is provided for better understanding of event management system 44. Assume for this example that ID section 70 from event 60a indexes the pointer to processor 62c in event processor pointer table 58. Assume further, that pointer to processor 62c points to event consumer 48c, as illustrated in FIG. 3. To begin, initial event handler 54 retrieves event 60a from posted event queue 56 at the consumer index 66. Initial event handler 54 takes the ID section 70 from event 60a for an index. Since, for this example, ID section 70 indexes pointer to processor 62c, initial event handler 54 retrieves pointer to processor 62c from event processor pointer table 58. Next, initial event handler 54 calls the event consumer 48c pointed to by pointer to processor 62c. As with immediate processing of a new event, initial event handler 54 passes the event data structure 68 to the event consumer 48c during the call operation.

To continue the example, event consumer 48c attempts to process the event 60a and passes first response 80 back to initial event handler 54. First response 80 indicates success, retry, or moved. Where success is indicated, initial event handler 54 increments the consumer index 66 to remove the successfully processed event 60a from posted event queue 56. Initial event handler 54 proceeds to either process the next event 60b or pass control back to operating system 42. One reason control is passed back to operating system 42 is to limit the number of events that can be processed by event management system 44 during any one call. Thus, in one embodiment, if a defined number of events have already been processed by event management system 44 during the current call, processing is returned to operating system 42.

When first response 80 indicates retry, initial event handler 54 does not increment consumer index 66 and immediately passes control to operating system 42. In each of these situations, success and retry, memory 30 associated with processing the event 60a is freed or released to the computer system 20 after first response 80 is received by initial event handler 54. In this manner, event management system 44 keeps memory 30 free for use in computer system 20.

When first response 80 indicates moved, initial event handler 54 increments consumer index 66 to remove the event 60a from posted event queue 56. Initial event handler 54 proceeds to process the next event 60b or pass control back to operating system 42. A moved response indicates that the event 60a has been moved to another queue. In one scenario, this is because the resources needed for processing the event 60a are not available. Thus, posted event queue 56 is not blocked by the moved event. Memory 30 associated with a moved event is not freed.

Figure 7:
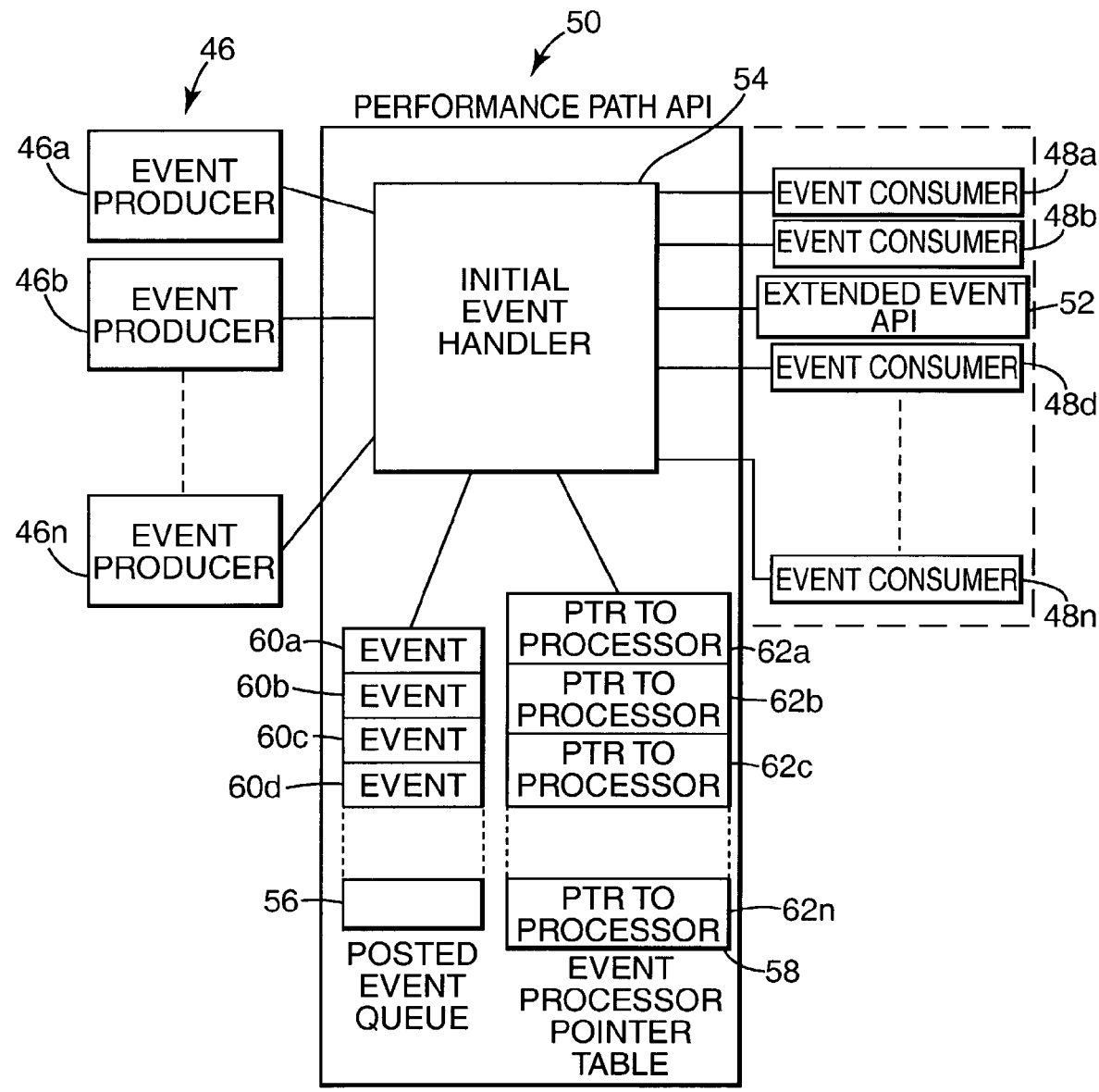
FIG. 7 is a block diagram illustrating an exemplary embodiment of a performance path API configured to call an extended event API.

FIG. 7 is a block diagram illustrating an exemplary embodiment of performance path API 50 configured to call extended event API 52. Performance path API 50 includes initial event handler 54, posted event queue 56, and event processor pointer table 58. Initial event handler 54 is in communication with event producers 46a–46n, event consumers 48a, 48b, 48d–48n, and extended event API 52. In the configuration illustrated in FIG. 7, initial event handler 54 is not in direct communication with event consumer 48c, because extended event handler 52 has taken the position previously occupied by event consumer 48c. In other performance path API 50 configurations, extended event handler 52 takes the place of any one, all or none of the event consumers 48a–48n.

Initial event handler 54 has numerous functions. For example, initial event handler 54 controls posted event queue 56 and accesses event processor pointer table 58. Initial event handler 54 receives events from event producers 46a–46n and posts events to posted event queue 56. Initial event handler 54 also retrieves events from posted event queue 56, uses event information to access event processor pointer table 58 and calls event consumers 48a, 48b, 48d–48n or the extended event API 52.

Posted event queue 56 holds event information in event elements 60a–60d. In one example embodiment, posted event queue 56 is a circular queue with up to 256 elements in memory 30. However, posted event queue 56 can be other suitable sizes and can be adjusted to accommodate user needs. Also, other embodiments of posted event queue 56 are not implemented as circular queues. For example, other embodiments of posted event queue 56 include a linked list queue and an array. Each event element 60a–60d contains information about an event from one of the event producers 46a–46n.

Event processor pointer table 58 includes pointer to processor elements 62a–62n for handling events. In the configuration illustrated in FIG. 7, the processors for handling events are event consumers 48a, 48b, 48d–48n and the extended event API 52. In this configuration, performance path API 50 calls the extended event API 52 instead of event consumer 48c. For example, pointer 62a points to event consumer 48a, pointer 62b points to event consumer 48b, pointer 62c points to the extended event API 52, pointer 62d points to event consumer 48d, . . . , and pointer 62n points to event consumer 48n.

Figure 8:
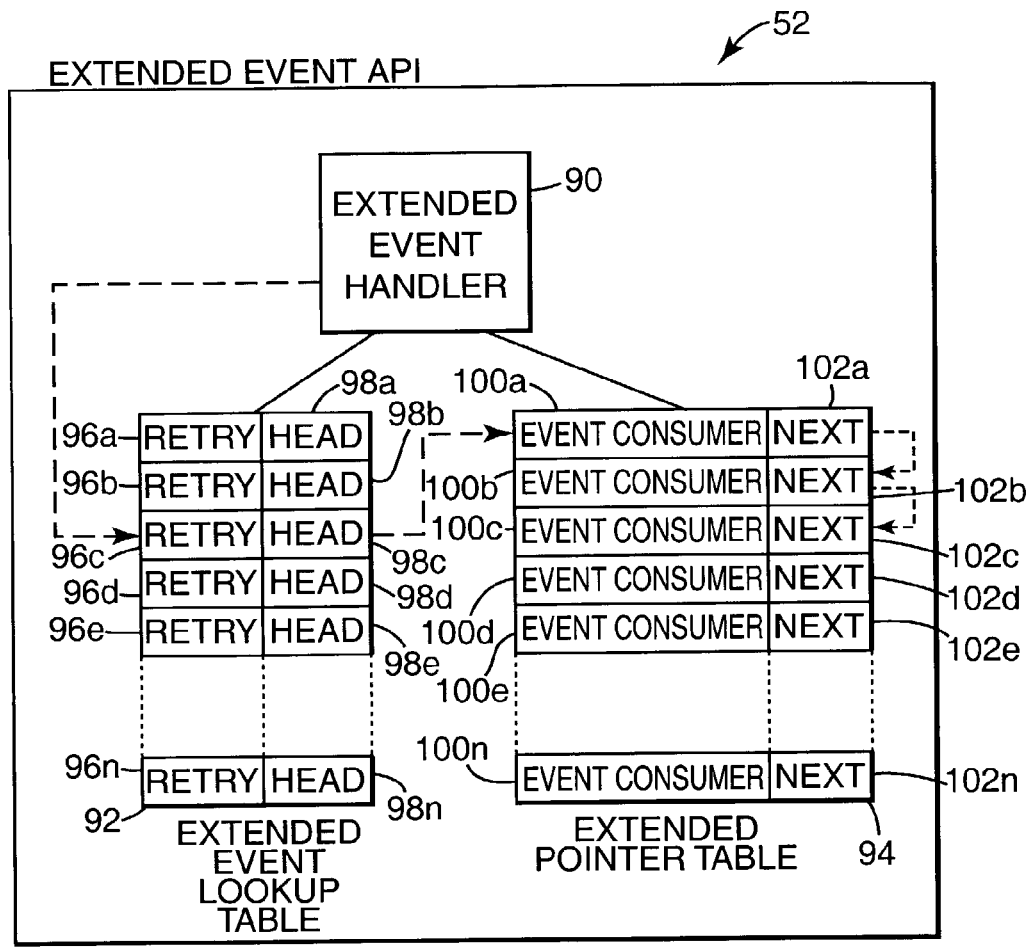
FIG. 8 is a block diagram illustrating an exemplary embodiment of an extended event API.

FIG. 8 is a block diagram illustrating one exemplary embodiment of extended event API 52. Extended event API 52 includes an extended event handler 90, an extended event lookup table 92, and an extended pointer table 94. Extended event handler 90 has numerous functions. For example a call to extended event API 52 is actually call to extended event handler 90. Extended event handler 90 manages and retrieves entries from extended event lookup table 92. Extended event handler 90 retrieves pointers from extended pointer table 94. Also, extended event handler 90 uses the retrieved pointers to call event consumers 48a–48z.

Extended event lookup table 92 includes event entries that extended event API 52 can process. These event entries include retry vectors 96a–96n and head vectors 98a–98n. The retry vectors 96a–96b and head vectors 98a–n are indexes into extended pointer table 94.

Extended pointer table 94 includes entries, which point to selected events consumers 48a–48z. Each entry in extended pointer table 94 contains one of event consumer pointers 100a–100n and a corresponding next pointer 102a–102n. Each one of event consumer pointers 100a–100n points to a corresponding one of event consumers 48a–48z. Each one of next pointers 102a–102n points to one of the entries in extended pointer table 94 to link one of event consumer pointers 100a–100n to another one of event consumer pointers 100a–100n. Event management system 44 employs extended pointer table 94 to execute multiple event consumers 48a–48z in a series for processing a single event.

Figure 9:
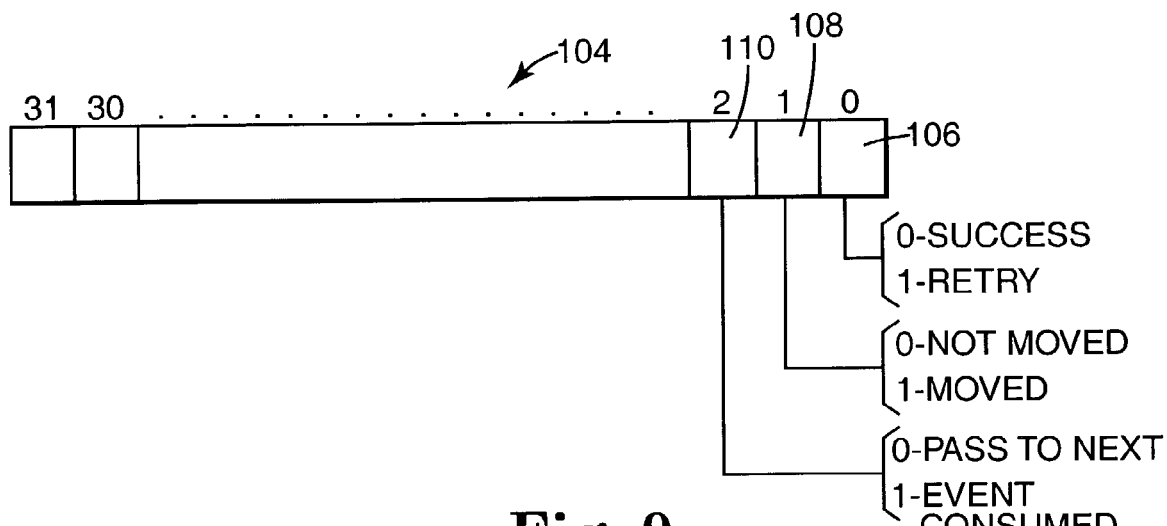
FIG. 9 is a diagram illustrating an exemplary embodiment of a second response passed from an event consumer to an extended event handler.

FIG. 9 is a diagram illustrating one embodiment of a second response 104 passed from one of event consumers 48a–48z to extended event handler 90. Second response 104 includes a bit zero indicated at 106, a bit one indicated at 108, and a bit two indicated at 110. In one embodiment, bit zero indicated at 106 indicates success with a zero and retry with a one. In one embodiment, bit one indicated at 108 indicates not moved with a zero and moved with a one. In one embodiment, bit two indicated at 110 indicates pass to next with a zero and event consumed with a one. Extended event handler 90 directs processing to the next selected one of event consumers 48a–48z or back to initial event handler 54 using second response 104.

In operation, the operating system 42 calls the event management system 44 to process new events and continue processing posted events 60a–60d. The initial event handler 54 configures each new event into an event data structure 68 having an ID section 70, a sub-event category section 72, and a data section 74. Initial event handler 54 also checks each new event and, based on preprogrammed criteria, either attempts processing the new event immediately or posts the new event to posted event queue 56. To immediately process the new event, initial event handler 54 calls an event processor, either one of the event consumers 48a–48n or the extended event API 52. Initial event handler 54 passes event data structure 68 to the event processor during this call operation. If the new event is successfully processed or moved, the new event is never posted to posted event queue 56. However, if a retry is indicated, initial event handler 54 posts the new event to posted event queue 56. New events are posted to posted event queue 56 by placing the event data structure 68 in posted event queue 56 at the producer index 64, which in one embodiment is the next available space in posted event queue 56. In one embodiment, initial event handler 54 posts all new events to posted event queue 56.

Initial event handler 54 uses consumer index 66 to process posted events 60a–60d from posted event queue 56. Initial event handler 54 retrieves one of the events 60a–60d at the consumer index 66. Initial event handler 54 employs the ID section 70 from the retrieved event as an index into event processor pointer table 58 to thereby retrieve a selected pointer to a processor 62 from the event processor pointer table 58. Next, initial event handler 54 calls the event processor pointed to by the selected pointer to the processor 62. This event processor is either one of the event consumers 48a–48n or the extended event API 52.

The following example operation includes a call to extended event API 52 and is provided for a better understanding of event management system 44. Assume for this example that ID section 70 from event 60*a* indexes the pointer to processor 62*c* in event processor pointer table 58. In addition, in the present example assume further, that pointer to processor 62*c* points to extended event API 52, as illustrated in FIG. 7, not event consumer 48*c*. To begin, initial event handler 54 retrieves event 60*a* from posted event queue 56 at the consumer index 66. Initial event handler 54 takes the ID section 70 from event 60*a* for an index. Since, for this example, ID section 70 indexes pointer to processor 62*c*, initial event handler 54 retrieves the pointer to processor 62*c* from event processor pointer table 58. Next, initial event handler 54 calls extended event API 52, instead of event consumer 48*c*. As with immediate processing of a new event, initial event handler 54 passes the event data structure 68 to extended event API 52 during the call operation. Processing continues with extended event API 52.

A call to extended event API 52 is actually a call to extended event handler 90, which continues processing by retrieving the ID section 70 from event 60*a*. ID section 70 is used as an index into extended event lookup table 92. Extended event handler 90 retrieves the retry vector 96*c* from extended event lookup table 92, as illustrated in FIG. 8 by the dashed line and arrow from extended event handler 90 to extended event lookup table 92. Initial event handler 90 determines if the retry vector 96*c* is null. If the retry vector 96*c* is not null, extended event handler 90 uses the retry vector 96*c* to access extended pointer table 94. However, if the retry vector 96*c* is null, extended event handler 90 retrieves the head vector 98*c* to access extended pointer table 94.

In the present example, the retry vector 96*c* is null and the head vector 98*c* is used to retrieve event consumer pointer 100*a*, as illustrated in FIG. 8 by the dashed line and arrow from the head vector 98*c* to event consumer pointer 100*a*. Event consumer pointer 100*a* points to any one of the event consumers 48*a*–48*z*. Extended event handler 90 calls the selected one of event consumers 48*a*–48*z* for processing event 60*a*.

The one of event consumers 48*a*–48*z* called by extended event handler 90 passes a second response 104 to extended event handler 90. The second response 104 indicates success or retry; not moved or moved; and pass to next or event consumed. If second response 104 indicates success and event consumed, extended event handler 90 passes a first response 80 indicating success to initial event handler 54 and nothing is placed into the retry vector 96*c*. Initial event handler 54 increments the consumer index 66 to remove event 60*a* from posted event queue 56 and either processes the next event 60*b* or passes control back to operating system 42.

When the second response 104 indicates success and pass to next, extended event handler 90 retrieves the next pointer 102*a* and accesses extended pointer table 94 to retrieve event consumer pointer 10*b*. Event consumer pointer 100*b* is used by extended event handler 90 to call one of the event consumers 48*a*–48*z*. Processing continues in the selected one of event consumers 48*a*–48*z*, which passes another second response 104 to extended event handler 90.

When the second response 104 indicates retry, extended event handler 90 sets the retry vector 96*c* to index event consumer pointer 100*a*. Next, extended event handler 90 passes a first response 80 indicating retry back to initial event handler 54. Initial event handler 54 does not increment the consumer index 66 and immediately passes control back to operating system 42. The next time operating system 42 calls event management system 44, processing from posted event queue 56 continues with event 60*a*. Extended event API 52 is called and the retry vector 96*c* is used to index event consumer pointer 100*a*. Extended event handler 90 calls the same one of event consumers 48*a*–48*z* to resume processing.

When the second response 104 indicates moved, extended event handler 90 does not set the retry vector 96*c* and passes a first response, 80 indicating moved to initial event handler 54. Initial event handler 54 increments the consumer index 66 to remove event 60*a* from posted event queue 56. Initial event handler 54 proceeds with processing the next event 60*b* or passes control back to operating system 42.

As before, when the first response 80 indicates success or retry, memory 30 associated with processing event 60*a* is freed for use in computer system 20. However, where the first response 80 indicates moved, memory 30 is not freed.

Figure 10:
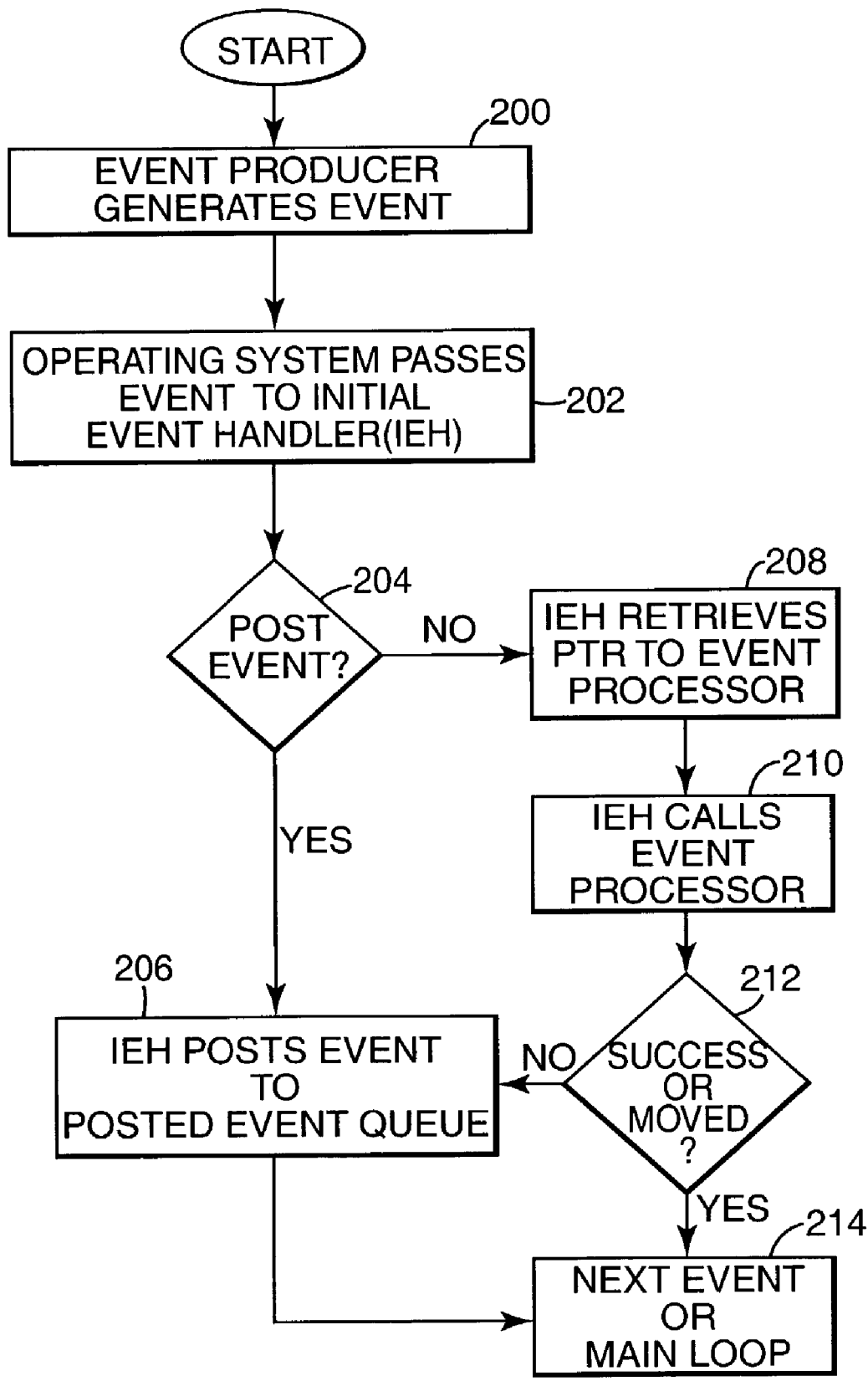
FIG. 10 is a flow chart illustrating an exemplary embodiment of new event processing, including immediately processing the new event and posting the new event.

FIG. 10 is a flow chart illustrating new event processing, including immediately processing the new event and posting the new event, according to one embodiment of the present invention. To start, as indicated at 200, an event producer 46 generates a new event in computer system 20. Operating system 42 retrieves and stores the new event for the next time operating system 42 calls event management system 44. At this time, as indicated at 202, operating system 42 passes the new event information to performance path API 50 and initial event handler (IEH) 54. Initial event handler 54 configures the event information into an event data structure 68 and decides, at 204, whether to post the new event. At 206, if the new event is posted, initial event handler 54 places the event data structure 68 in posted event queue 56 at the producer index 64. At 214, initial event handler 54 then continues to process the next event in posted event queue 56 or passes control to operating system 42. In one scenario, however, initial event handler 54 has instructions to immediately process the new event before posting the new event.

At 208, when the new event is processed before posting, initial event handler 54 obtains the index and retrieves the pointer to a selected event processor. At 210, initial event handler 54 then calls the event processor using this pointer. This event processor can be either one of the event consumers 48*a*–48*n* or the extended event API 52. In either situation, the event processor attempts to process the new event and passes the first response 80 back to initial event handler 54, which determines, at 212, if the first response 80 indicates success or moved, as opposed to retry. If processing was successful or the new event was moved, initial event handler 54 passes control back to operating system 42 or proceeds to process the next event, as indicated at 214. On the other hand, if the first response 80 indicates retry, initial event handler 54 posts the event, at 206, by placing the new event data structure 68 into posted event queue 56 at the producer index 64. From 206, initial event handler 54 processes the next event or passes control to operating system 42, as indicated at 214.

Figure 11:
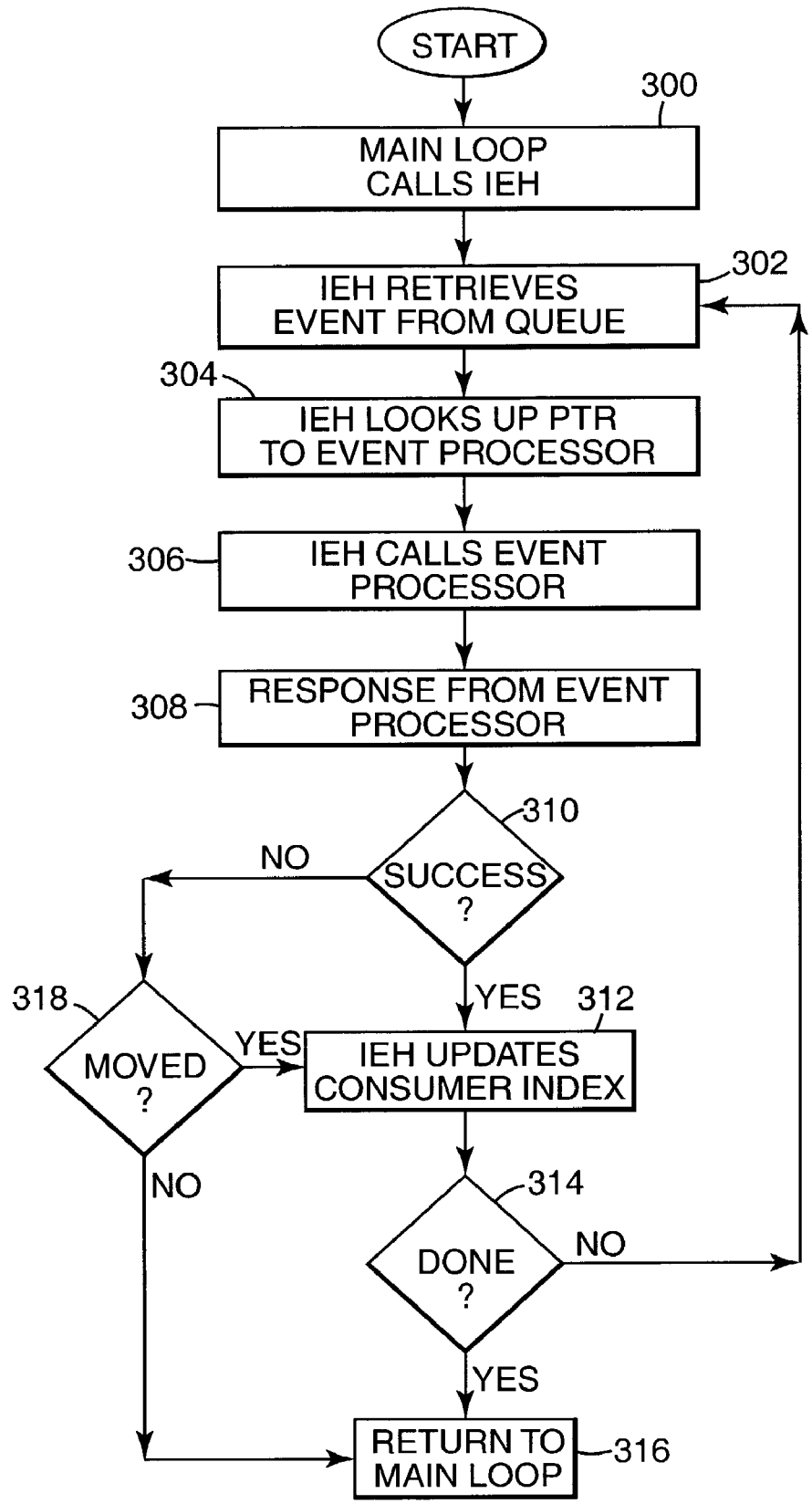
FIG. 11 is a flow chart illustrating an exemplary embodiment of event processing from a posted event queue in one exemplary embodiment of a performance path API.

FIG. 11 is a flow chart illustrating event processing from posted event queue 56 in one exemplary embodiment of performance path API 50, according to one embodiment of the present invention. At 300, event processing begins with operating system 42 calling performance path API 50 and initial event handler 54 from the main loop of the operating system. After processing new events and to continue processing posted events, initial event handler 54, at 302, retrieves an event from posted event queue 56 at the consumer index 66. At 304, initial event handler 54 employs the index from the selected event and looks up the pointer to the corresponding event processor. Initial event handler 54 then calls the event processor, at 306, which returns the first response 80 to initial event handler 54, at 308. This first response 80 contains success, retry, and moved indicators.

At 310, initial event handler 54 checks the success indicator. If event processing was successful, initial event handler 54 updates the consumer index 66, at 312, to remove the event from posted event queue 56. Initial event handler 54 then determines, at 314, if event processing is complete or the limit has been reached. If processing is not complete, initial event handler 54, at 302, retrieves the next event from posted event queue 56 and continues event processing. However, if processing is complete or the limit has been reached, initial event handler 54 passes control back to operating system 42, as indicated at 316.

When the first response 80 does not indicate success, initial event handler 54 determines, at 318, if the event was moved. If the event was not moved, retry is indicated and control is passed to operating system 42, as indicated at 316. If the event was moved, initial event handler 54 updates the consumer index 66, at 312, to remove the event from posted event queue 56. Event processing continues as if the event had been successful.

Figure 12:
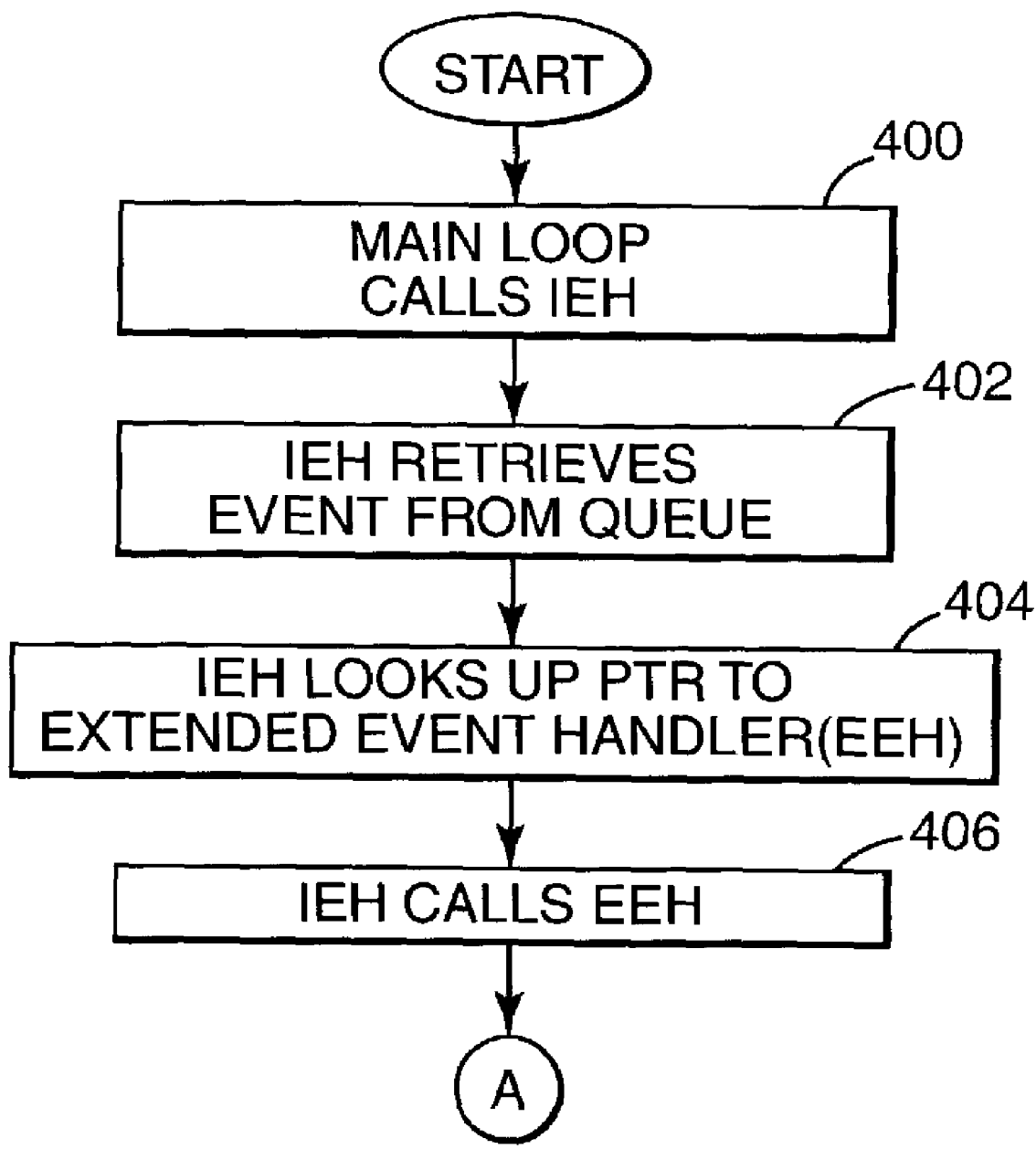
FIG. 12 is a flow chart illustrating the beginning of event processing through an exemplary embodiment of an extended event API.
Figure 13:
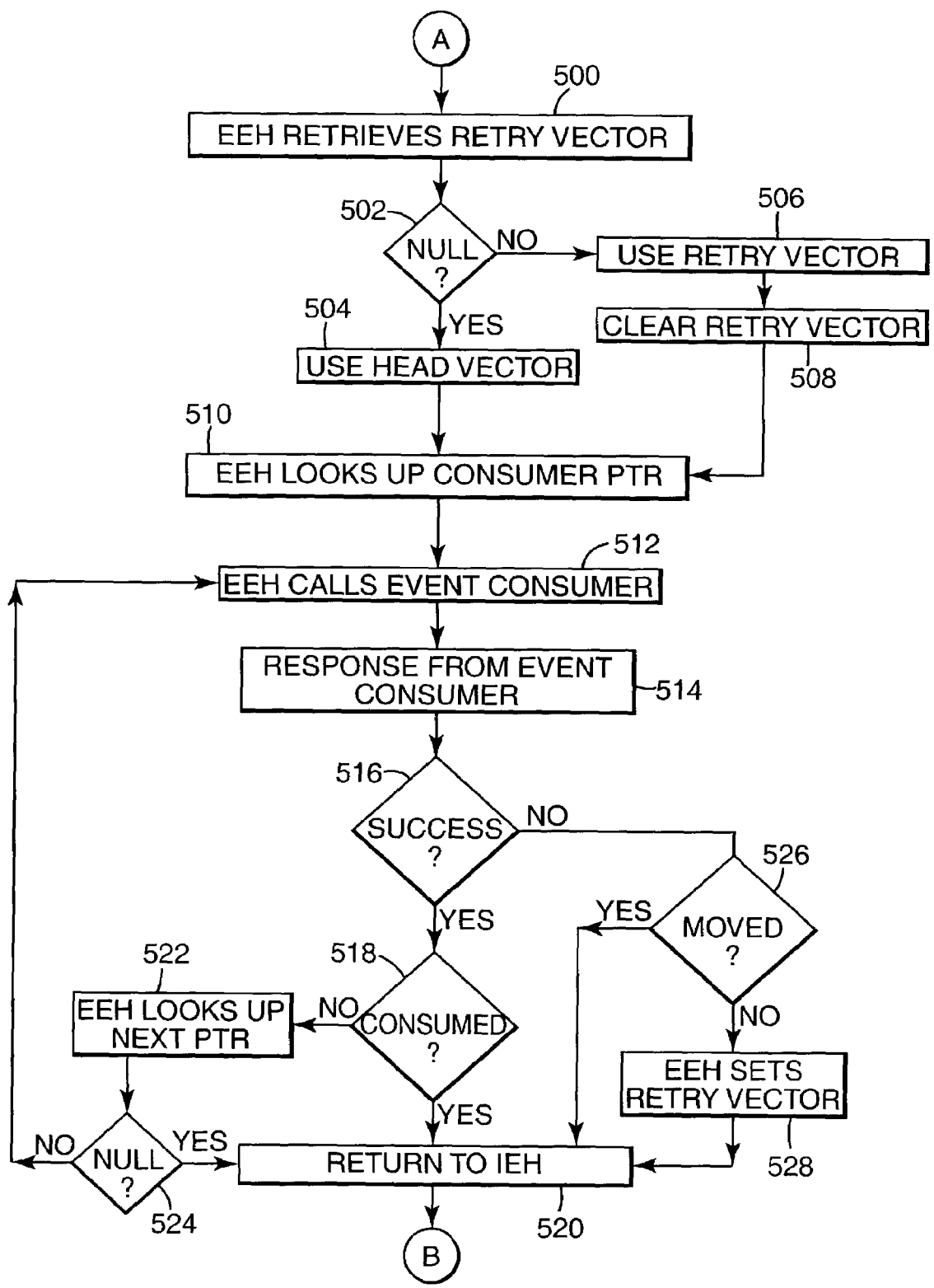
FIG. 13 is a flow chart illustrating continued event processing through an exemplary embodiment of an extended event API.
Figure 14:
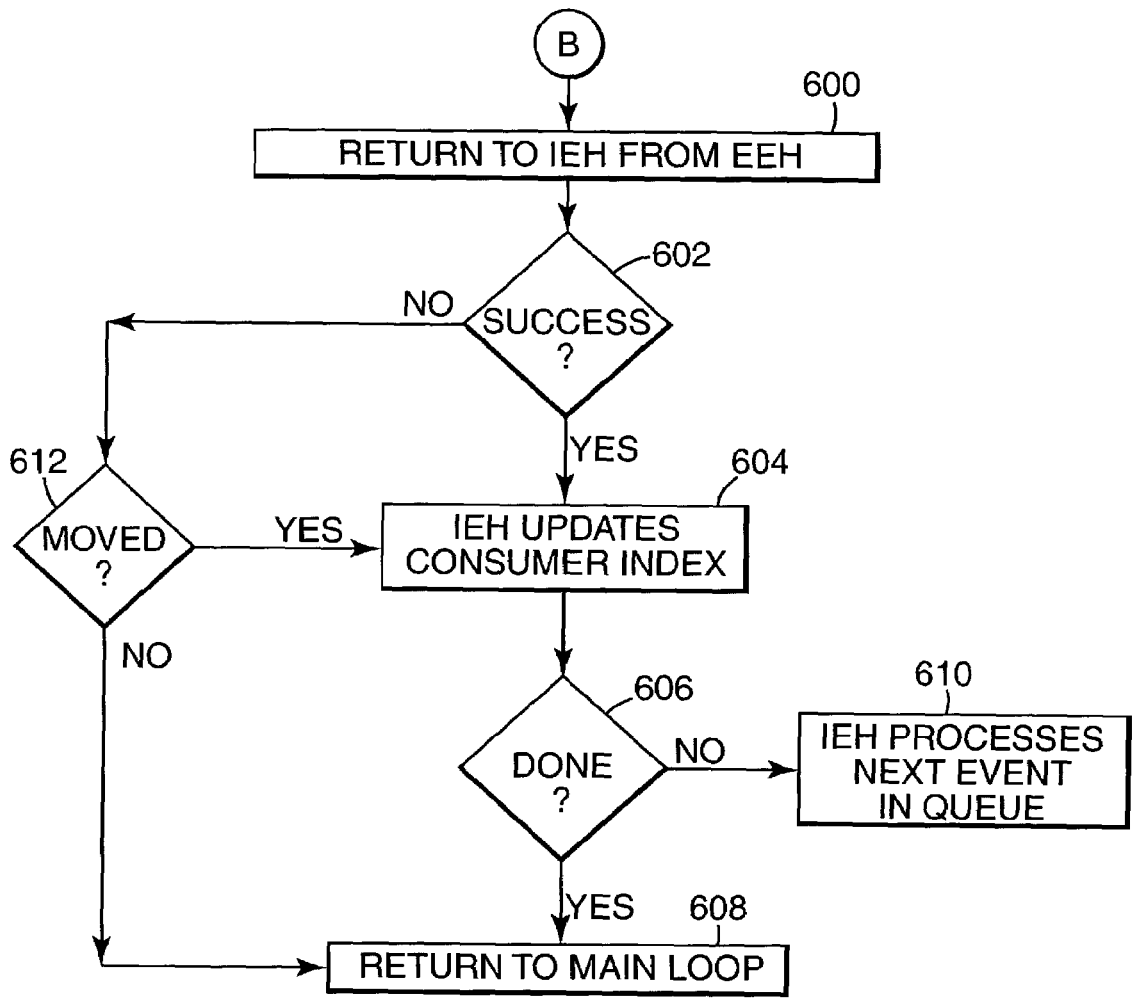
FIG. 14 is a flow chart illustrating event processing through an exemplary embodiment of a performance path API after returning from an exemplary embodiment of an extended event API.

FIGS. 12, 13, and 14 are flow charts illustrating event processing through an exemplary embodiment of extended event API 52, according to one embodiment of the present invention. At 400 in FIG. 12, event processing begins with operating system 42 calling performance path API 50 and initial event handler 54 from the main loop of the operating system. By way of example, assume that initial event handler 54 immediately begins processing events from posted event queue 56. In another example, initial event handler 54 calls extended event API 52 while immediately processing a new event. At 402, initial event handler 54 retrieves an event from posted event queue at the consumer index 66. Initial event handler 42 employs the ID section 70 from the retrieved event to use as an index into event processor pointer table 58. At 404, initial event handler 54 looks up the pointer to an event processor, which in this example is a pointer to extended event API 52 and thereby is actually a pointer to extended event handler 90 in the extended event API. At 406, initial event handler 54 uses the selected pointer to call extended event handler 90 for event processing. Event processing continues in extended event API 52 with extended event handler 90.

FIG. 13 is a flow chart illustrating event processing through the exemplary embodiment of extended event API 52, according to one embodiment of the present invention. Extended event handler 90 receives event data in the call instruction from initial event handler 54. At 500, extended event handler 90, employing the event ID section 70 as an index, retrieves a retry vector 96 from extended event lookup table 92. At 502, extended event handler 90 checks the retry vector 96 for a null condition. If the retry vector 96 is null, extended event handler 90 uses a corresponding head vector 98, as indicated at 504. Alternatively, if the retry vector 96 is not null, extended event handler 90 uses the retry vector 96, as indicated at 506.

In one embodiment, extended event handler 90 makes a working copy of the retry vector 96, and uses the copy of the retry vector 96. The retry vector 96 in extended event lookup table 92 is then cleared, at 508. Processing continues with extended event handler 90 looking up the event consumer pointer from extended pointer table 94, as indicated at 510, using the head vector 98 or the retry vector 98. Extended event handler 90 calls the event consumer 48, at 512, and the event consumer 48 responds to extended event handler 90 with a second response 104, at 514. This second response 104 contains indicators for success or retry; moved or not moved; and pass to next or event consumed.

At 516, extended event handler 90 checks the second response 104. When the second response 104 indicates success, extended event handler 90, at 518, continues to check whether the event was consumed. If the event was successfully processed and consumed, extended event handler 90 passes control back to initial event handler 54, as indicated at 520. In this situation, extended event handler 90 passes a first response 80 indicating success back to initial event handler 54.

When the event was successfully processed but not consumed, extended event handler 90, at 522, looks up the pointer to the next event consumer. At 524, extended event handler 90 checks the next pointer. If the next pointer is null, processing is passed to initial event handler 54, at 520, with success indicated. If the next pointer is not null, processing continues, at 510, with the extended event handler 90 looking up the next event consumer pointer for processing.

When the second response 104 indicates the event was not processed successfully, at 516, the second response is further checked, at 526, to determine if the event was moved. If the event was moved, processing is returned to initial event handler 54, at 520, with moved indicated. However, if the event was not moved a retry is indicated and extended event handler 90, at 528, sets the retry vector 96 in extended event look up table 92. Processing is then returned to initial event handler 54 with the retry indicator set, at 520. Thus, event processing is eventually returned from extended event handler 90 to initial event handler 54.

FIG. 14 is a flow chart illustrating event processing through the exemplary embodiment of performance path API 50 after returning from extended event API 52, according to one embodiment of the present invention. At 600, processing returns to initial event handler 54 from extended event handler 90 with the first response 80. Initial event handler 54 checks the first response 80, at 602, to determine if event processing was successful. If event processing was successful, initial event handler 54 updates the consumer index 66, at 604, to remove the event from posted event queue 56. At 606, initial event handler 54 checks to determine if event processing is completed or if the limit has been reached. If event processing is complete, initial event handler 54 passes control back to the main loop of operating system 42, as indicated at 608. If event processing is not complete, initial event handler 54 processes the next event in posted event queue 56, as indicated at 610.

When the first response 80, passed from extended event handler 90, indicates event processing was not successful, initial event handler 54 checks, at 612, to determine if the event was moved. If the event was not moved, a retry is indicated and initial event handler 54 returns processing to the main loop of operating system 42, at 608. However, if the event was moved, processing continues at 604 where initial event handler 54 updates the consumer index 66 to remove the event from posted event queue 56. Initial event handler 54 then checks to determine if processing is complete, at 606. If processing is complete, control is passed to the main loop of operating system 42, at 608. If processing is not complete, processing continues with the next event in posted event queue 56, as indicated at 610.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An event management system, operating on a computer system having event producers and event consumers, the event management system comprising:
    an initial event handler program;
    an event queue having a first event, wherein the initial event handler program retrieves the first event from the event queue for event processing that returns a first response to the initial event handler program, wherein the initial event handler program manages the first event on the event queue based on the first response;
    an extended event handler program, wherein the initial event handler program uses the first event to call the extended event handler program for further event processing; and
    an extended event, wherein the extended event handler program retrieves the extended event for further event processing and the extended event includes a retry vector and a head vector, wherein the head vector relates to the beginning of a chain of event consumers and the retry vector relates to where processing left off in the chain of event consumers.

2. The event management system of claim 1, further comprising an event processor pointer in a pointer table, wherein the initial event handler program uses the first event to look up the event processor pointer from the pointer table.

3. The event management system of claim 2, wherein the first event includes an index into the pointer table, wherein the initial event handler program uses the index to look up the event processor pointer.

4. The event management system of claim 2, wherein the event processor pointer points to one of the event consumers, wherein the initial event handler program uses the event processor pointer to call the event consumer.

5. The event management system of claim 2, wherein the event processor pointer points to the extended event handler program, wherein the initial event handler program uses the event processor pointer to call the extended event handler program for further event processing.

6. The event management system of claim 5, further comprising an extended event lookup table that includes the extended event.

7. The event management system of claim 6, further comprising extended pointers in an extended pointer table, wherein the extended event handler program uses the extended event to look up one extended pointer from the extended pointer table.

8. The event management system of claim 7, wherein the extended event includes the retry vector and the head vector indexing extended pointers in the extended pointer table, wherein the extended event handler program uses the retry vector to look up a first extended pointer unless the retry vector is null, wherein the head vector is used to look up a second extended pointer where the retry vector is null.

9. The event management system of claim 5, wherein the extended event handler program receives a second response, which includes event processing result indicators.

10. The event management system of claim 9, further comprising an extended pointer table having extended pointers including an event consumer pointer and a next event consumer pointer, wherein the extended event handler program uses the next event consumer pointer for further event processing where the second response indicates success and pass to next.

11. The event management system of claim 9, wherein the second response indicates success and consumed, and the extended event handler program returns success in the first response to the initial event handler program.

12. The event management system of claim 9, wherein the second response includes retry, wherein the extended event handler program returns retry in the first response to the initial event handler program.

13. The event management system of claim 1, wherein the first response indicates retry and the initial event handler program leaves the first event in the event queue.

14. The event management system of claim 1, wherein the first response is success or moved and the initial event handler program removes the first event from the event queue.

15. The event management system of claim 1, wherein the first response is success or retry and the initial event handler program frees memory associated with the first event.

16. The event management system of claim 1, wherein a second event is received by the initial event handler program from the event producers, wherein the initial event handler program posts the second event to the end of the event queue.

17. The event management system of claim 16, wherein the initial event handler program posts the second event to the event queue in an event data structure having an ID section, a sub-category section and a data section.

18. A method for managing events in a computer system including at least one processor and memory and having event producers and event consumers, the method comprising:
    executing an initial event handler program that is stored in the memory and configured to schedule events that are requests for some action;
    retrieving an event from an event queue, wherein the event queue has at least one event from one of the event producers;
    calling an event processor for processing the retrieved event and returning a first response;
    receiving the first response from the event processor, wherein the first response indicates a result of processing the retrieved event; and
    managing the retrieved event on the event queue based on the first response, wherein calling an event processor comprises:
        calling an extended event handler program based on the first event; and
        analyzing an extended event via the extended event handler program, which includes:
            determining if a retry vector is null, wherein the retry vector indicates which event consumer in a chain of event consumers processing left off at;
            retrieving the retry vector where the retry vector is not null; and
            retrieving a head vector where the retry vector is null, wherein the head vector indicates the beginning of the chain of event consumers.

19. The method of claim 18, wherein calling an event processor comprises calling one of the event consumers.

20. The method of claim 18, further comprising:
looking up the extended event from an extended event lookup table;
analyzing the extended event for an indexing vector; and
looking up an extended pointer using the indexing vector, wherein calling the chain of event consumers includes using the extended pointer.

21. The method of claim 18, further comprising receiving a second response from one of the event consumers in the chain of event consumers, wherein the second response indicates the results of event processing.

22. The method of claim 21, further comprising:
looking up an extended pointer entry having an event consumer pointer and a next event consumer pointer; and
using the next event consumer pointer where the second response indicates success and pass to next.

23. The method of claim 18, wherein managing the retrieved event includes leaving the retrieved event on the queue or removing the retrieved event from the queue based on the first response.

24. The method of claim 18, wherein retrieving an event includes retrieving a consumer index that points to the event in the event queue and indexing the event in the event queue using the consumer index.

25. The method of claim 18, further comprising:
receiving an event from one of the event producers;
organizing the event into an event data structure; and
posting the event data structure to the event queue.

26. A computer system, comprising:
memory storing an initial event handler program configured to schedule events that are requests for some action, an event queue, an extended event handler program and an extended event, wherein the initial event handler program has instructions including event queue posting instructions, event queue retrieving instructions and event queue management instructions and the extended event includes a retry vector and a head vector, wherein the head vector relates to the beginning of a chain of event consumers and the retry vector relates to where processing left off in the chain of event consumers; and
a processor, which executes the initial event handler program, wherein the processor executes to event queue posting instructions to post a new event to the event queue and wherein the processor executes the event queue retrieving instructions to retrieve a posted event from the event queue for event processing that returns a first response to the processor, wherein the processor executes the initial event handler program to call the extended event handler program for further event processing based on the posted event retrieved from the event queue and the processor executes the extended event handler program to retrieve the extended event for further event processing, wherein the processor executes the event queue management instructions to manage the retrieved event on the event queue based on the first response.

27. The computer system of claim 26, wherein the memory includes a pointer to event processing in a pointer table and the processor executes the initial event handler program to analyze the posted event retrieved from the event queue and look up the pointer to event processing.

28. The computer system of claim 26, wherein the first response is retry and the processor executes the event queue management instructions to leave the retrieved event on the event queue.

29. The computer system of claim 26, wherein the first response is success or moved and the processor executes the event queue management instructions to remove the retrieved event from the event queue.

30. The computer system of claim 26, wherein the first response is success or retry and the processor executes the initial event handler program to free memory associated with the retrieved event.

31. The computer system of claim 26, wherein the processor executes the extended event handler program to call more than one event consumer.

32. An event management system, operating on a computer system including at least one processor and memory configured to store the event management system and having event producers and event consumers, the event management system comprising:
an initial event handler program configured to schedule events that are requests for some action;
an event queue having a first event, wherein the initial event handler program retrieves the first event from the event queue for event processing that returns a first response to the initial event handler program, wherein the initial event handler program manages the first event on the event queue based on the first response;
an extended event handler program, wherein the initial event handler program uses the first event to call the extended event handler program for further event processing; and
an extended event wherein the extended event handler program retrieves the extended event for further event processing and the extended event includes a retry vector and a head vector, wherein the head vector relates to the beginning of a chain of event consumers and the retry vector relates to where processing left off in the chain of event consumers.

* * * * *

UNITED STATES PATENT AND TRADEMARK OFFICE
CERTIFICATE OF CORRECTION

PATENT NO. : 7,177,925 B2 Page 1 of 1
APPLICATION NO. : 10/259534
DATED : February 13, 2007
INVENTOR(S) : Glenn Carcido It is certified that error appears in the above-identified patent and that said Letters Patent is hereby corrected as shown below:

Col. 17, Line 44:
In Claim 26, delete "to" and insert -- the --, therefor.

Col. 18, Line 44:
In Claim 32, after "event" insert -- , --.

Signed and Sealed this

Twelfth Day of August, 2008

JON W. DUDAS
*Director of the United States Patent and Trademark Office*